United States Patent
La Rocca et al.

(10) Patent No.: US 8,276,206 B2
(45) Date of Patent: Sep. 25, 2012

(54) SYSTEMS AND METHODS FOR PARTIAL MATCHING SEARCHES OF ENCRYPTED RETAINED DATA

(75) Inventors: Maurizio La Rocca, Sarno (IT); Amedeo Imbimbo, Caivano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 12/679,344

(22) PCT Filed: Sep. 21, 2007

(86) PCT No.: PCT/EP2007/060059
§ 371 (c)(1),
(2), (4) Date: Mar. 22, 2010

(87) PCT Pub. No.: WO2009/036810
PCT Pub. Date: Mar. 26, 2009

(65) Prior Publication Data
US 2010/0211800 A1 Aug. 19, 2010

(51) Int. Cl.
*G06F 21/00* (2006.01)
(52) U.S. Cl. .......................................... 726/26; 713/189

(58) Field of Classification Search ................... 707/705, 707/706, 711, 757, 783; 705/2, 3; 726/26, 726/27, 30; 713/189
See application file for complete search history.

(56) References Cited

U.S. PATENT DOCUMENTS

| | | | |
|---|---|---|---|
| 5,787,428 A | 7/1998 | Hart | |
| 2004/0215981 A1* | 10/2004 | Ricciardi et al. | 713/202 |
| 2005/0165623 A1* | 7/2005 | Landi et al. | 705/2 |
| 2006/0026156 A1 | 2/2006 | Zuleba | |
| 2009/0043707 A1* | 2/2009 | Roberts et al. | 705/51 |

FOREIGN PATENT DOCUMENTS

EP 1 193 585 A2 4/2002

* cited by examiner

*Primary Examiner* — Edward Zee

(57) ABSTRACT

Systems and methods are provided for encryption allowing partial matching searches to retrieve data that is retained in a database. A user identification number or other characteristic is stored in unencrypted form such that a wildcard search may be performed to retrieve one or more encrypted indexes associated with the unencrypted user identification. These encrypted indexes are then unencrypted by use of a key to determined their associated unencrypted index and corresponding targeted retained data. The targeted retained data may then be accessed by an authorized entity such as a law enforcement agency.

20 Claims, 5 Drawing Sheets

Fig. 1

| ENCRYPTED COLUMN — 105 | OTHER DATA [CC/Admin.] — 110 |
|---|---|
| f("John") — 115 | ..... — 135 |
| f("Bob") — 120 | ..... — 140 |
| f("Jack") — 125 | ..... — 145 |
| f("Tom") — 130 | ..... — 150 |

| ENCRYPTED CALL DATA (MSISDN) — 205 | OTHER DATA - PLAIN TEXT [START TIME] — 210 |
|---|---|
| 0815147123 — 215 | 2007-01-01 10:40:00 — 235 |
| 0815147456 — 220 | 2007-01-01 10:40:00 — 240 |
| 081333444 — 225 | 2007-01-01 10:40:00 — 245 |
| ..... — 230 | ..... — 250 |

200

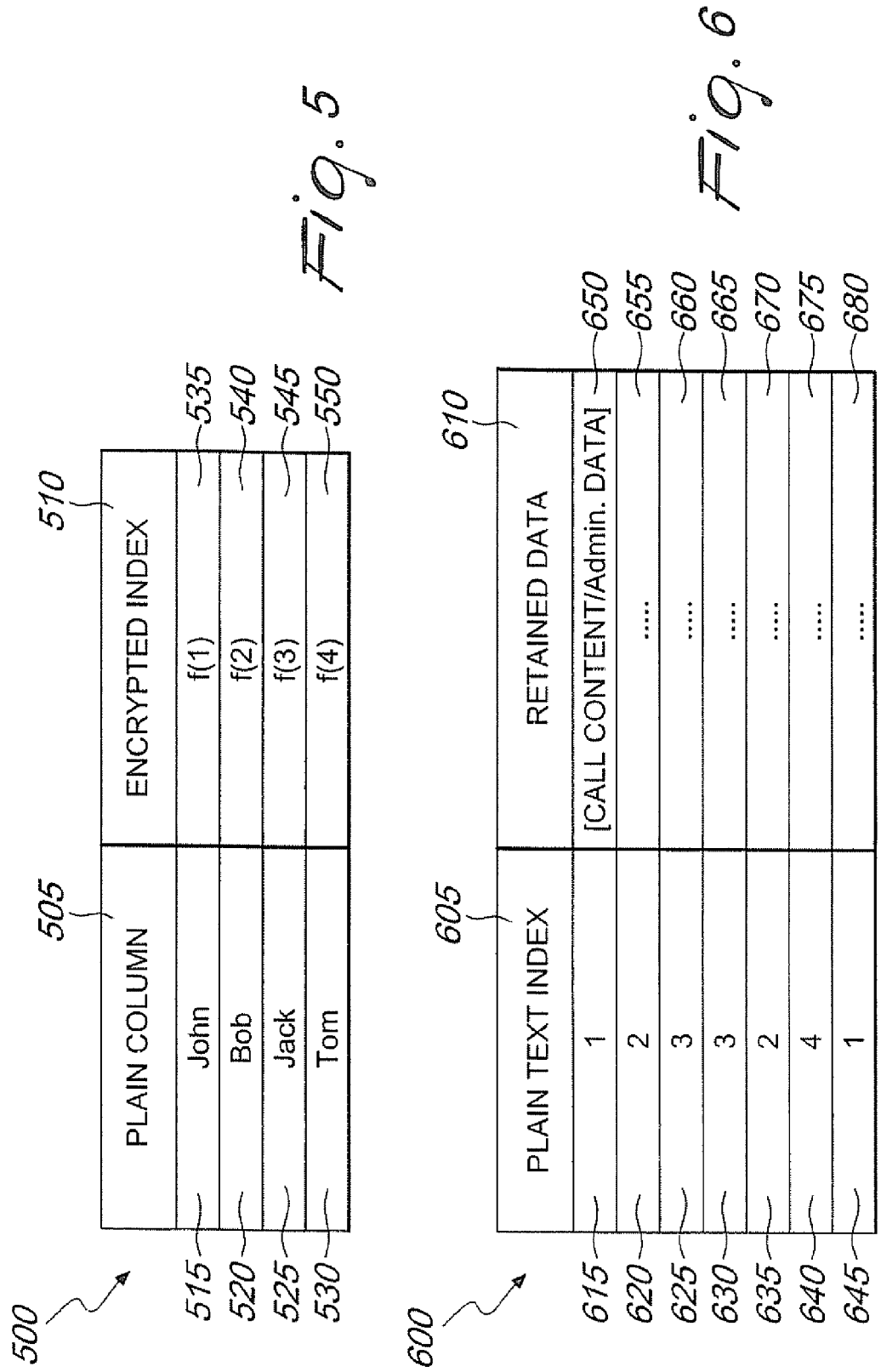

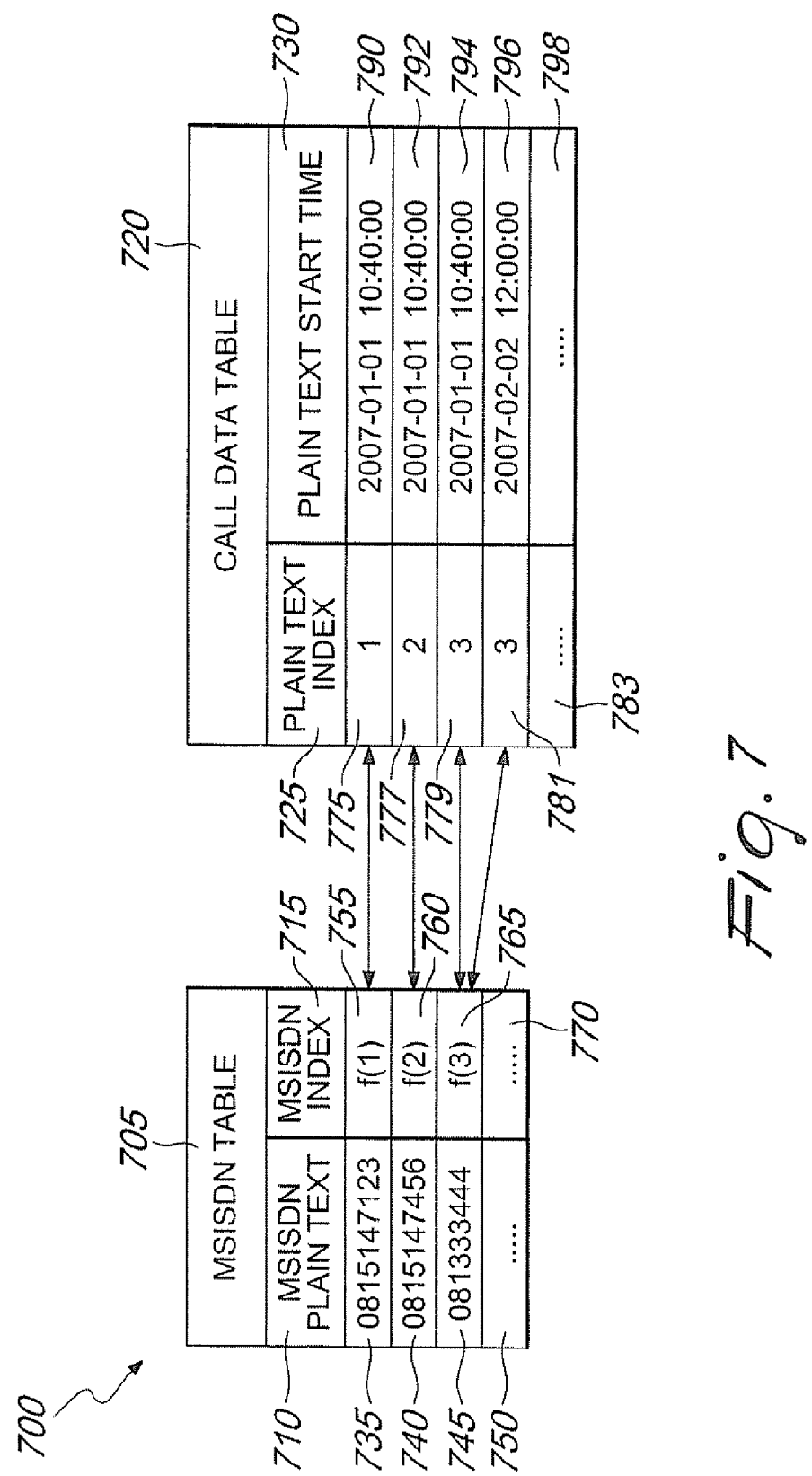

SYSTEMS AND METHODS FOR PARTIAL MATCHING SEARCHES OF ENCRYPTED RETAINED DATA

TECHNICAL FIELD

The present invention relates generally to retrieval of retained data from a database. More specifically, the present invention relates to encrypted data retrieval using partial search matching criteria.

BACKGROUND ART

Encryption is the process of transforming data to make it unreadable to anyone who does not possess special knowledge. This special knowledge is often referred to as a key that unlocks the protected data. Encryption is used to restrict data access to authorized users in a variety of civilian and governmental databases and network systems such as for example mobile telephone networks, bank automated teller machines, and Internet e-commerce. Encryption is also used in digital rights management to restrict the use of copyrighted material, as well as with software to protect against software piracy and reverse engineering.

In many countries operators and Internet service providers are required to retain data traffic generated from public telecommunication networks including Internet services. Authorized law enforcement agencies may legally access this retained data from service provides for a variety of reasons, such as the detection, investigation, and prosecutions of a wide range of criminal offenses or conspiracies. Due to various national laws, as well as for security and privacy reasons, access to this retained data should be restricted to authorized entities, such as law enforcement agencies. To maintain the security of the retained data, it is stored in encrypted form.

When an authorized entity seeks specific retained data, related, for example to a single phone call made by a single individual, it must be located from within a database that may be extremely large. When this encrypted retained data is stored in file systems, databases, or other storage forms, it is not possible to perform a search for this data based on partial matching criteria. As a result, search inquiries must include an exact match of the search term. This results in a slower and less efficient search. Furthermore, encryption keys are susceptible to attacks from unauthorized entities such as hackers. In the event of an attack, the encryption key must be changed. This requires decryption with the old key of an the entire database, followed by re-encryption of the entire database with a new key. This too is a timely, costly, and inefficient process.

DISCLOSURE OF THE INVENTION

From the foregoing, it is apparent there is a direct need for solutions enabling the collection, storage, retention, and delivery of retained data generated by telecommunication and Internet services in public fixed and mobile networks, while maintaining the security of the retained data. Further, it is desirable to enable a secure database search by implementing partial matching search criteria and to retrieve or access only a subset of the retained data. This improves the speed and efficiency of data handover to authorized entities, and lowers cost.

Thus, the aim of the present invention is to overcome the above mentioned problems by a method for retrieving targeted retained data from a database. The method receives a request to access targeted retained data that is associated with a targeted user, and the request includes partial search matching criteria associated with the targeted user. The method accesses a first table that includes a plain column and an encrypted index column. The plain column includes a plurality of unencrypted identification data that is associated with a plurality of users, and the encrypted index column includes a plurality of encrypted indexes where an encrypted index is associated with each of a plurality of users. The method selects, from the first table, at least one encrypted index that matches the partial search matching criteria. The method also accesses a second table that includes a plain index column and a retained data column. The plain index column includes an unencrypted index that is associated with each of the plurality of users, and the retained data column includes a plurality of retained data, including the targeted retained data. The method selects, from the second table, at least one unencrypted index that is associated with at least one encrypted index that matches the partial search matching criteria, identifies, in the column of retained data, the targeted retained data associated with the unencrypted index, and retrieves the targeted retained data from the database.

The above mentioned aim and others are also achieved by a system for retrieving targeted retained data from a database. The system includes a receiver that is associated with a processor that receives a request to access targeted retained data that is associated with a targeted user. The request includes partial search matching criteria that is associated with the targeted user. The processor accesses a first table that includes a plain column and an encrypted index column. The plain column includes unencrypted identification data that is associated with a plurality of users, and the encrypted index column includes a plurality of encrypted indexes where an encrypted index is associated with each of a plurality of users. The processor selects an encrypted index from the first table that matches the partial search matching criteria. The processor also accesses a second table that includes a plain index column and a retained data column. The plain index column includes an unencrypted index that is associated with each of the plurality of users, and the retained data column includes a plurality of retained data, including the targeted retained data. The processor selects, from the second table, at least one unencrypted index that is associated with at least one encrypted index that matches the partial search matching criteria, identifies, in the column of retained data, the targeted retained data associated with the unencrypted index, and retrieves the targeted retained data from the database.

In certain embodiments, the systems and methods disclosed herein may also include decrypting the encrypted index column that is associated with the targeted retained data, and re-encrypting the encrypted index column associated with the targeted retained data using a second key. The retrieved targeted retained data may be transmitted to an authorized entity and may include administrative data as associated with the targeted retained data. In an embodiment the retrieved targeted retained or any associated administrative data may be transmitted to an entity via one or more handover interfaces, and the targeted retained data may include data that has traveled through at least part of a communication network such as a fixed or mobile telephone network.

These aims and objects are achieved by the methods and systems according to independent claim 1 and any other independent claims. Further details may be found in the remaining dependent claims.

Other aspects and advantages of the systems and methods disclosed herein will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the systems and methods disclosed herein will be more fully understood from the following description of various embodiments, when read together with the accompanying drawings, in which:

FIG. 1 is a table depicting encrypted retained data;

FIG. 2 is a table depicting encrypted retained data;

FIG. 5 is a table depicting a first table including a plain column and an encrypted index column in accordance with an embodiment of the invention;

FIG. 6 is a table depicting a second table including a plain index column and a retained data column in accordance with an embodiment of the invention; and FIG. 7 depicts two tables where the first table includes a plain column and an encrypted index column, and where the second table includes a plain index column and a plain text retained data column in accordance with an embodiment of the invention.

WAYS OF CARRYING OUT THE INVENTION

Figure 3:
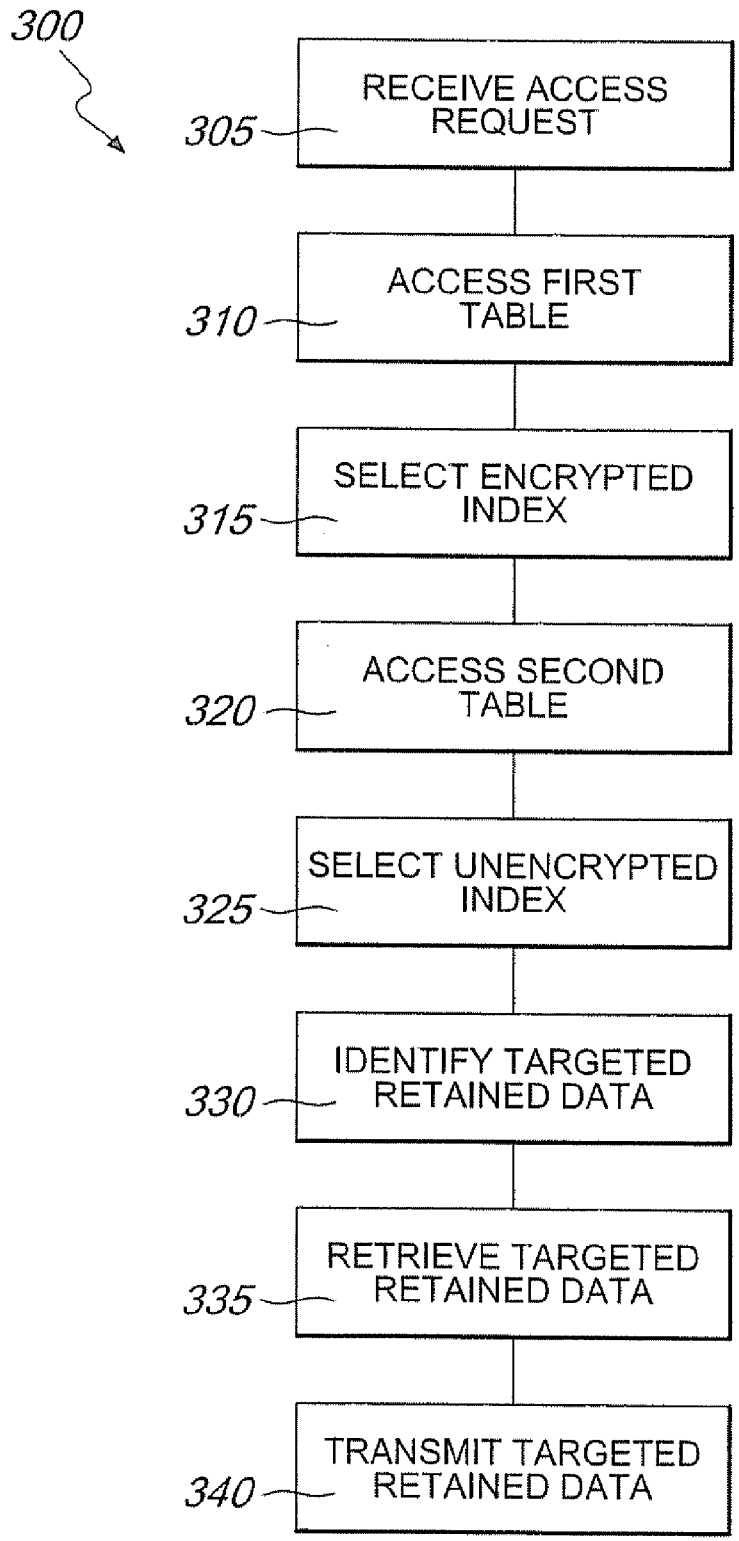
FIG. 3 is a flow chart depicting a method for retrieving retained data in accordance with an embodiment of the invention.

As shown in the drawings for the purposes of illustration, the invention may be embodied in systems and methods for retrieving targeted retained data from a database. Embodiments of the systems and methods disclosed herein allow use of encryption algorithms that ensure confidentiality of sensitive retained data as well as the use of partial search matching criteria when retrieving, accessing, or transmitting targeted retained data to an authorized entity.

Partial search matching generally enables retrieval of stored or retained data based upon a search for that data based upon a search string that includes a variable characters, sometimes referred to as wildcards. Many indicators for this variable character may be used, such as for example an asterisk "*". For example, a database may be searched for retained data associated with a user named "John". An exact search would include search criteria with the name "John". However, in situations where the searcher knows, for example, only the first character of the name to be searched, an exact search may not be possible. In this example a searcher could use partial search matching criteria that includes a variable character, such as "J*". This generally results in a search of a database for all user names beginning with or including the letter "J", such as James, Jack, Jessica, for example. However, when data is stored in encrypted form on existing systems partial search matching criteria cannot be used.

In brief overview, FIG. 1 is a table 100 depicting encrypted retained data on an existing system. Table 100 includes encrypted column 105 and an unencrypted data column 110. Generally when data is stored in file systems, databases, or other storage formats, partial search matching cannot be used to perform a search for data that is stored on a database. In typical cryptography parlance, $y=f(x)$ is the function that returns the encryption of x; and $x=f^{-1}(y)$ is the function the returns the decryption of y. In table 100, encrypted column 105 stores f(x), which is the function that returns the encryption of "x" in cells 115, 120, 125, and 130. The number of cells appearing in encrypted column 105 is limited to four only for illustration purposes, and any number of cells is possible. Because table 100 stores usernames 115-130 in encrypted form, it is not possible to search for "J*" to find data associated with cell 115 ("John") or cell 125 ("Jack") because f(J*) does not match either f(John) or f(Jack), where a "cell" as used herein generally includes a row or data from a row of a column of any table described herein. Because encrypted column 105 stores username (or any other) data only in encrypted form, indicated by f(x), to maintain the confidentiality intended by the encryption, as well as to comply with various legal and industry requirements, a partial search implementing wildcards fails to produce a match when applied to table 100 because the encryption of the partial search (e.g. f(J*)) will be different from the encrypted usernames (e.g. f(John)). As a result, a search of table 100 for retained data, such as call content or administrative data contained in unencrypted data column 110 in any of cells 135-150 and associated with any of cells 115-130 cannot include wildcards.

Similarly, FIG. 2 is also a table 200 depicting encrypted retained data on an existing system. Table 200 includes encrypted call data column 205 and unencrypted data column 210. In this example of an existing system, instead of usernames such as those stored in encrypted column 105, table 200 includes call data such a Mobile Station Integrated Services Digital Network (MSISDN) number, as call identification indicators that identify users. Other user identification numbers, such as International Mobile Subscriber Identity (IMSI) or International Mobile Equipment Identity (IMEI) numbers may be used. Because these numbers, indicated in cells 215-230 of encrypted column 205 are generally considered sensitive and confidential data, they are retained in encrypted form. As with table 100, a partial search using a wildcard, when transformed by encryption, will not match any of these user identity numbers and the search will fail in its effort to retrieve unencrypted plain text data from data column 210. In the example shown in table 200, data column 210 stores data associated with calls made by users over a telephone or other network such as the start time of a data transmission such as a phone call. This data is stored in calls 235-250.

In brief overview, FIG. 3 is flow chart depicting a method 300 for retrieving retained data from a database in accordance with an embodiment of the invention. Method 300 typically includes receiving a request to access targeted retained data associated with a targeted user, the request including partial search matching criteria associated with the targeted user (STEP 305). Receiving step (STEP 305) may include receipt of a warrant authorizing retrieval of data this is retained on a database. This warrant may be issued by a competent tribunal or authority. The request may include a request to access all data, such as electronic communications that took place over a network and are stored in a database as well as administrative data, (time, date, call length, etc.) associated with the electronic communication. The request may be received electronically, verbally, or manually. The request may also be in the form of an electronic communication received by a third party. Receiving step (STEP 305) may include reception by a processor, receiver, or administration function of a warrant from a law enforcement agency with identification of users, services, or other targets whose associated data is to be retrieved. Receiving step (STEP 305) typically includes receiving any signal or indication authorizing, ordering, or requesting the retrieval of retained data that is stored on a database and that relates to an electronic communication such as a telephone that is, was, or will be made over a network in any format such as a telephone network or the Internet. Typically, receiving a request to access targeted retained data (STEP 305) may include receiving a request to access all retained data to or from a targeted user. The request may be for an open time period, or for a given period of time, such as a particular hour, day, or month. The request may also order the retrieval of data related to various specified services, such as voice, video, or the like.

Method 300 also typically includes the step of accessing a first table (STEP 310). Generally this includes accessing a first table (STEP 310) that includes both a plain column having unencrypted identification data associated with a plurality of users, and an encrypted index column having an encrypted index associated with each of a plurality of users. Accessing the first table (STEP 310) generally includes one or more processors directing logic operations sufficient to interact with a database where the first table may be stored. Accessing the first table (STEP 310) generally includes interface with and reading or manipulation of any data retained in the first table, such as, for example, accessing the first table to search any data contained therein for matches against a search inquiry that includes partial search matching criteria such as wildcard characters.

Generally, in response to a search request that includes partial search matching criteria, method 300 selects from the first table at least one encrypted index that matches the partial search matching criteria (STEP 315). In an illustrative embodiment, a search inquiry is received (STEP 305) that includes a wildcard or other partial search matching criteria. The first table is typically accessed (STEP 310). The first table generally contains an unencrypted plain text column and an encrypted index column. The search inquiry including any partial search matching criteria is queried against the unencrypted plain text column, for example, and may return as a result data included in rows of an encrypted index column are associated with rows from the unencrypted plain that matches the partial search inquiry. This operation may be implemented by a processor or similar logic device that is adapted to determine if the wildcard based search inquiry matches entries in the plain text column of the first table, and if data exists in the encrypted index column of the first table that corresponds to the matched entries in the plain text column.

Method 300 also typically accesses a second table (STEP 320). Accessing the second table (STEP 320) generally includes accessing a second table that includes both a plain text index column with an unencrypted index associated with each of a plurality of users, as well as a retained data column with a plurality of retained data that includes targeted retained data that is typically the subject of the received request (STEP 310). Accessing the second table (STEP 320) generally includes one or more processors directing logic operations sufficient to interact with a database where the second table may be stored. Accessing the second table (STEP 320) generally includes interface with and reading or manipulation of any data retained in the second table, such as, for example, accessing the second table determine the existence of unencrypted plain text indexes that correspond to the encrypted indexes of the first table, where the encrypted indexes correspond to the plain text unencrypted column of the first table that was the subject of the search that included partial search matching criteria.

Generally, method 300 also includes the step of selecting from the second table at least one unencrypted index (STEP 325), such as for example a plain text index, that is associated with at least one selected encrypted index from the first table.

Typically, the at least one unencrypted index that is selected (STEP 325) includes a data cell of an unencrypted plain text index column of the second table. The selected cell or cells of the unencrypted index generally are the unencrypted counterpart of encrypted index cells included in the encrypted index column of the first table. Continuing with this illustrative embodiment, these encrypted index cells themselves are the counterparts of cells of the unencrypted plain text column of the first table that match the wildcard search that was received (STEP 305) as part of the request to access the retained data of a targeted user.

Method 300 generally continues by identifying (STEP 330) and retrieving (STEP 335), in the column of retained data of the second table, the targeted retained data associated with the selected (STEP 325) at least one unencrypted index. Identifying step (330) typically includes a processor or logic device such as an administration function determining the existence of a cell located in the retained data column of the second table that corresponds to an identified or selected cell of the unencrypted plain text column of the second table, which in turn corresponds to one or more cells of both the encrypted index column and the plain text unencrypted column of the first table. The data identified (STEP 330) in the retained data cells as corresponding to the partial search matching criteria may be transferred or copied from its existing location in a database. This data manipulation may include retrieving (STEP 335), creating, displaying, or making available to an authorized entity an electronic representation of the identified (STEP 330) retained data as well as copying or transferring this identified (STEP 330) retained data. Retrieving (STEP 335) the target retained data that has been identified as matching the partial search criteria generally includes outputting the targeted retained data or a copy thereof from the database where it is stored.

Once at least some of the identified (STEP 330) retained data has been retrieved (STEP 335), method 300 may then include transmitting at least a portion of the retrieved retained data to at least one authorized entity (STEP 340). This transmission (STEP 340) may take place from elements associated with node of a computer network that has identified (STEP 330) and retrieved (STEP 335) the targeted retained data, and may include one or more of a transmitter, received, administration function, delivery function or mediation function, as well as one or more handover interfaces. At least a portion of the targeted retained data, including associated administrative data, may be transmitted (STEP 340) to at least one authorized entity, such as a law enforcement monitoring facility, for example. In a general embodiment, the targeted retained data may be transmitted from a mediation function of a node in a computer network over various handover interfaces to one or more authorized entities, such as law enforcement monitoring facilities.

Figure 4:
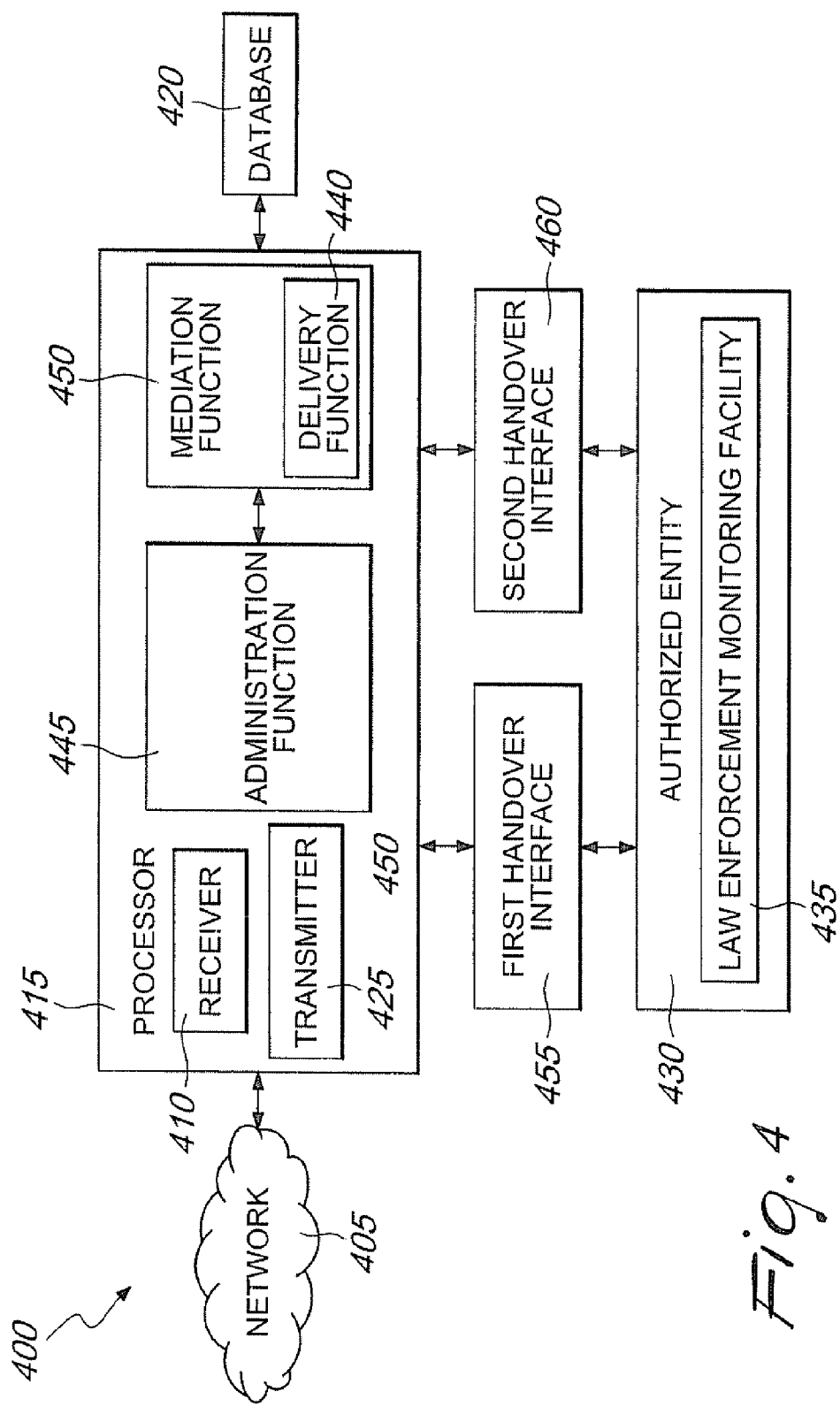
FIG. 4 is a block diagram depicting a system for retrieving retained data in accordance with an embodiment of the invention.

In brief overview, FIG. 4 is a block diagram depicting a system 400 for retrieving retained data in accordance with an embodiment of the invention. System 400 illustrates a system that may be used to fulfill, for example, European Union data retention directive 2006/24/EC or industry standards such as the ETSI DTS/LI-0039 5 or ETSI DTS/LI-0033 5 standards. System 400 generally includes or associated with at least one network 405. Network 405 may include any telecommunications network through which data transmissions are passed. Generally, network 405 may include any of a fixed network, a mobile network, or a convergent fixed and mobile core network, and may support circuit switched or packet switched traffic. Network 405 may be implemented in compliance with some international standards, for example the Third Generation Partnership Project or the European Telecommunications Standard Institute standards. Network 405 may also include one or more broadband networks that may include access, aggregation, metro, or wide area networks for wireline broadband, as well as the Internet.

Network 405 generally interacts or is associated with at least one receiver 410, which is generally a device capable of receiving or accepting incoming signals, data, requests, or commands. Receiver 410 may be a component of a computer or other device used to implement system 400. Alternately, receiver 410 may be a stand alone device capable of both receiving and transmitting commands or data. Generally, receiver 410 may receive a request to access any retained data that is stored in a database and related to a data transmission over a network including any associated administrative data such as the date, time, length, location, or other administrative information. The receiver 410 may receive a request directly entered into receiver 410 by, for example, a human operator. Receiver 410 generally receives as input a request to access targeted retained data associated with a targeted user where the request includes partial search matching criteria associated with the target user, such as for example the first three characters of the targeted users name, or the first 4 digits of the targeted users MSISDN or other identifying number.

In various embodiments a human operator may input into receiver 410 a request to access retained data such as an audio, video, or other data message to or from any type of user equipment. The request may, for example, stem from a search warrant issued by a government or authorized institution authorizing interception of a data transmission. In various embodiments, this request may be communicated directly from the authorized institution to receiver 410. In alternate embodiments, the request may be communicated by an intermediary, such as a human operator who receives the request from an authorized source, and then inputs the request to system 400 via receiver 410 or a graphical user interface. Typically, the request received by receiver 410 includes partial search matching criteria such as a request that uses wildcard symbols.

Receiver 410 generally interacts or is associated with at least one processor 415, and in an illustrative embodiment both may be included in the same physical logic device. Processor 415 may be located within or external to network 405. Generally, processor 415 is any logic device capable of data manipulation, such as a microprocessor chip capable of data processing, with sufficient processing power to perform the operations described herein. In various embodiments processor 415 may be included as a central processing unit of a computer. Processor 415 is generally adaptable to determine if retained data corresponding to partial search matching criteria exists in a database based on a received request to access targeted received retained data.

Processor 415 is typically adapted to access a first table, where the first table includes a plain column that generally contains unencrypted identification data in a plurality of cells. This unencrypted identification data, such as a username MSISDN or other means of identifying a particular user is typically contained in cells within the plain data column, and each cell (i.e. row) may be associated with a particular user, or a particular retained data transmission made by a particular user over network 405. The first table also typically includes an encrypted index column associated with retained data that contains, in a plurality of cells, encrypted index data corresponding to the unencrypted identification data stored in cells of the plain column.

In an illustrative embodiment, processor 415 takes the wildcard request to access targeted retained data from receiver 410 and accesses the first table. If the plain column of the first table includes matches satisfying the partial search criteria, processor 410 selects from the first table at least one encrypted index cell from the encrypted index that is associated with a plain column cell of the plain column that matches the request that includes partial search matching criteria.

Processor 415 is also typically adapted to access a second table. The second table generally includes a plain index column, and the plain index column typically includes a plurality of cells containing unencrypted plain text indexes corresponding to the encrypted indexes of the first table and associated with each of a plurality of users. The second table also generally includes a retained data column that typically contains retained data corresponding to data transmissions of a plurality of users over network 405. The data transmissions are retained and stored in cells of the retained data column. The retained data that is the subject of the request received by receiver 410 is generally referred to herein as targeted retained data, and is typically a subset of the retained data. Both retained data and targeted retained data may include data transmission such as a telephone call over a network, as well as associated administrative data.

Processor 415 is generally adapted to select from the second table at least one unencrypted plain text index that is associated with the selected encrypted index of the first table, and therefore also associated with the plain column of the first table that matches the partial search matching criteria. Processor 415 then generally identifies, detects, or locates in the column of retained data, the targeted retained data that is associated with the selected unencrypted index.

Method 300 also generally includes processor 415 or associated elements retrieving the targeted retained data from a database 420. Database 420 generally allows for storage of data in any electronic medium or format, and may include various forms of read only memory, random access memory, redundant arrays of independent disks, data signals embodied in one or more of a carrier wave, a computer disk (magnetic, or optical (e.g., CD or DVD, or both), non-volatile memory, tape, a system memory, and a computer hard drive, for example.

In an illustrative embodiment, the targeted retained data, once located, identified, and retrieved from database 420, may be transmitted by transmitter 425 to authorized entity 430. Typically, transmitter 425 sends or transmits the data transmission to authorized entity 430. In certain embodiments, transmitter 425 may transmit retained data that includes contents of communication, such as the actual audio or video file, or other related information, such as the identity of user equipment associated with the origin or destination of the retained data, or with a targeted user whose communications through network 405 have been retained in database 420 and are now subject to a request for access. Transmitter 425 generally is capable of transmitting the retained data or a copy thereof in any manner. This may include electronic, wired, or wireless transmission, as well as transmitting a coded transmission. Transmitter 425 may access network 405 or another network to transmit the retrieved retained data in any medium, including a medium different from the original transmission medium. In certain embodiments, transmitter 425 is capable of transmitting related data such as called number, calling number, type of service, start and end of communication or other data. In an alternate embodiment, transmitter 425 may include a printer for printing the contents of the intercepted transmission, where the printed contents are then transmitted to authorized entity 430.

In various embodiments transmitter 425 may include a separate device for transmitting. In other embodiments, transmitter 425 may be included in the same device as processor 415, receiver 410, or any other element associated with processor 415. Transmitter 425 may include one or more mediation functions that transmit intercepted data transmissions over one or more interfaces, such as handover interfaces, to their intended destination. In some embodiments, any combination of receiver 410, processor 415, or other elements discussed below may be included in a single device, such as a computer. Transmitter 425 is generally capable of transmitting any signal in any format including audio, video, or picture files such as coded human speech, a text message, a date of transmission, a time of transmission, a location of transmission, or data identifying a source or intended recipient of the transmission.

Authorized entity 430 is generally the agency or person authorized to receive the retrieved targeted retained data. Generally, the authorization for authorized entity 430 to receive this data is granted by a government or governmental organization. In some embodiments, authorized entity 430 may be the entity that sent the initial request, received by receiver 410, to access targeted retained data. In some embodiments, authorized entity 430 may include at least one law enforcement agency or law enforcement monitoring facility 435. In various embodiments, there may be more than one authorized entity 430, and in some embodiments multiple authorized entities 430 are not aware of each others' existence. Multiple authorized entities 430 may also receive different portions of the targeted retained data or different related information associated with the retained data, for example.

Authorized entity 430 may include a monitoring center designed to allow access by authorized personnel to the targeted retained data. Typically, authorized entity 430 is able to receive any data associated with the data transmission. In various embodiments a stand-alone related information report may be transmitted to authorized entities 430 informing them of administrative data associated with the targeted retained data.

In an illustrative embodiment, a data transmission or copy thereof that travels through network 405 is saved in database 420 as retained data. When an entity, such as authorized entity 430 has a legitimate need to access specific retained data (i.e. targeted retained data), it may send a request to receiver 410 or associated element to access this targeted retained data so that is may be transmitted to authorized entity 430. Targeted retained data or associated administrative data may be transmitted to, from, or between processor 415 and authorized entity 430 via one or more of delivery function 440, administration function 445, mediation functions 450, first handover interface 455, or second handover interface 460, all of which may be associated with or integral to processor 415, receiver 410, or transmitter 425.

Generally, a data transmission between any of network 405, database 420, and authorized entity 430 is forwarded to at least one delivery function 440. Delivery function 440 is typically associated with or integral to processor 415, receiver 410, or transmitter 425. Delivery function 440 is generally capable of receiving at least portions of data transmissions including retained data being input into database 420, retained data transmitted from database 420, and targeted retained data transmissions being sent to authorized entity 430. In an embodiment, targeted retained data may be forwarded from database 420 to delivery function 440. In some embodiments, delivery functions 440 may prevent multiple authorized entities 430 from becoming aware of each others' existence.

As can be seen in FIG. 4, processor 415 generally includes at least one Administration Function (ADMF) 445. Administration function 445, as well as delivery function 440 or mediation function 450 may all interface with authorized entities 430, and may be integral to processor 415, receiver 410, transmitter 425. Although any suitable interface may be used, the interface between ADMF 445 and authorized entity 430 may include first handover interface 455 or second handover interface 460. Mediation functions 450 generally convert data on first handover interface 455 and second handover interface 460 into a format compatible with authorized entity 430 and national laws, regulatory, or industry requirements. Mediation functions 450 also typically receive all or part of the retained data, such as any Contents or Communication (CC) and forward them on, where they are finally received by one or more authorized entities 430. In embodiments including more than one authorized entity 430, ADMF 445 may act to keep separate instances of targeted retained data of each individual authorized entity 430 separate. ADMF 445 may be partitioned to ensure appropriate separation of the targeted retained data transmissions between different authorized entities 430.

In an embodiment, first and second handover interfaces 455 and 460 logically separate the targeted retained data— such as a telephone call placed through network 405 that was retained in database 420—from administrative data such as request or response information. In an illustrative embodiment, first handover interface 455 may transport various kinds of administrative or request and response information to or from a requesting authority such as authorized entity 430 or a communication service provider that may be responsible for retaining data transmissions through network 405. For example, first handover interface 455 may transport data indicating the data of transmission, time of transmission, length of transmission, parties involved, or other similar administrative data related to the targeted retained data. Continuing with this illustrative embodiment, second handover interface 460 may transport the actual targeted retained data from a communication services provider that controls database 420 to authorized entity 430. First handover interface 455 and second handover interface 460 are typically interchangeable, such that either one of the two databases may transport either the targeted retained data itself or any associated data, such as administrative data. In some embodiments there may be any number of handover interfaces, from one to more than two. In an embodiment, first handover interface 460 may be used to send requests of queries, and second handover interface 460 may be used to forward the results of the queries, such as the retained data, to a law enforcement monitoring facility or other authorized entity 430.

In brief overview, FIG. 5 is a table depicting a first table 500 including a plain column 505 and an encrypted index column 510 in accordance with an embodiment of the invention. Plain column 505 typically includes a plurality of cells 515-530 that include plain text data, and encrypted index column 510 includes a plurality of cells 535-550. This plain text data of plain column 505 is generally unencrypted and as such may be responsive to a data search based on partial search matching criteria such as wildcards. The encrypted index column 510 is typically encrypted. Although a limited number of cells is depicted in table 500 any number of cells may exist. For example, in first table 500 a partial search criteria "j*" would match both "John" as stored in cell 515 and "Jack" as stored in cell 525. "John" cell 515 corresponds to cell f(1) 535 of encrypted index column 510, and "Jack" corresponds to cell f(3) 545 of encrypted index column 510. In this illustrative embodiment, indexes (j*) have been selected from table 500 based on partial search matching, and encrypted indexes f(1) and f(3) are returned in response to the wildcard search f(j*).

For each index (j) obtained based on the partial search matching results as exemplified above, the systems and methods disclosed herein generally proceed to second table 600 of FIG. 6 to identify and retrieve the targeted retained data based on the partial search matching criteria. In brief overview, FIG. 6 is a table depicting a second table 600 including a plain text index column 605 and a retained data column 610 in accordance with an embodiment of the invention. In an embodiment both plain text index column 605 and retained data column 610 may be unencrypted. Plain text index column 605 generally includes a plurality of plain text index cells 615-645, and retained data column 610 generally includes a plurality of retained data cells 650-680. In an embodiment, cells 615-645 of plain text index column 605 may include the unencrypted plain text indexes associated with their corresponding encrypted index of cells 535-550 of encrypted index 510. For each encrypted index obtained from encrypted index column 510, (i.e. f(1) and f(3) in the example described above,) the systems and methods described herein generally proceed to select, from second table 600 the row of cell matching f(j) in both plain text index column 605 and corresponding retained data column 610.

To continue with the previous illustrative embodiment, the systems and methods may select $f^{-1}(j)$, that is, $f^{-1}(f(1))$ and $f^{-1}(f(3))$. This results in a selection of plain text index cells with the index "1" and "3", that is plain text index cells 615, 625, 630, and 645 of plain text index column 605. These cells correspond with retained data cells 650, 660, 665, and 680 of retained data column 610. Typically the data retained in any of the cells of retained data column 610 may include any data transmissions over network 405, such as telephone, video, or voice over Internet protocol calls, as well as any associated or related data or events related to the data, time, length, location or medium of the transmission, as well as the parties involved in the transmission or other related information.

The above described example results in identification of the cells in retained data column 610 that match a wildcard search initially performed on plain column 505. This wildcard search returns the appropriate cells of encrypted index column 510, which is then associated with cells of plain text index column 605 and their corresponding cells in retained data column 610, which generally include the targeted retained data stored in database 420 that may then be sent to authorized entity 430 such as one or more law enforcement monitoring facilities 435.

The systems and methods disclosed herein generally enable the selection of a subset of retained data. This subset is generally the targeted retained data requested by authorized entity 430. In the event that the encryption techniques have been compromised due, for example, to an unauthorized attack, a change of an encryption key may be needed. Because these systems and methods enable retrieval of a specific subset of the retained data, in an embodiment only this subset of retrieved data—the targeted retrieved data—is decrypted with an old key and re-encrypted with a new key in response to a potentially compromised cypher. This generally eliminated the need to decrypt and re-encrypt all retained data stored in database 420.

In brief overview, FIG. 7 depicts a system 700 including two tables where MSISDN table 705 includes a plain MSISDN column 710 and a MSISDN encrypted index column 715, and where call data table 720 includes a plain text index column 725 and a plain text start time column 730 in accordance with an embodiment of the invention. The illustrative embodiment depicted in system 700 is generally analogous to a combination of tables 500 and 600. In the previous example, plain column 505 included usernames, "Jack", "John", etc. In FIG. 7, plain text MSISDN column 710 includes Mobile Station Integrated Services Digital Network (MSISDN) number, as call identification indicators that identify users in cells 735-750 as an alternative to the usernames indicated in cells 515-530 of plain column 505. Other user identification numbers, such as International Mobile Subscriber Identity (IMSI) or International Mobile Equipment Identity (IMEI) numbers may be used in various embodiments. Cells 735-750 of MSISDN column 710 are typically in plain text, i.e. unencrypted. Cells 735-750 generally correspond to at least one of cells 755-770 in encrypted MSIDSN index column 715.

A wildcard search of MSISDN (or other) identification numbers contained in the cells of column 710 typically returns at least one corresponding cell from encrypted MSISDN index column 715. Performing an unencryption procedure on these cells in turn generally results in identification or selection of one or more of cells 775, 777, 779, 781, or 783 from plain text index column 725. Because each cell of plain text index column 725 is typically associated with at least one cell from plain text start time column 730, such as one or more of cells 790, 792, 794, 796, or 798, the data from these cells in plain text start time column 730 may be identified and retrieved as the targeted retained data associated with the wildcard search. As shown, plain text start time column 730 includes start time data of transactions that occurred through network 405, however in various embodiments, plain text start time column 730 may include various types of retained data, from the contents of the communications over network 405 to other associated data such as date, time, location, parties involved, or other related information. Storing the MSISDN or other identification indicators in unencrypted plain text allows for accurate and efficient wildcard searches while still preserving confidentiality of the retained data by providing a level of encryption between the identifying information and the retained data associated with a given MSISDN or other similar identifier.

For example, referring to FIG. 7, a wildcard search of MSISDN plain text column 710 for "0815147*" would retrieve cells 735 and 740, which correspond to encrypted f(1) and f(2) cells 755 and 760. Performing a decryption of these cells returns cells 775 and 777 from plain text index column 725, and these cells correspond to targeted retained data in cells 790 and 792, which may then be identified, accessed, or retrieved as desired in response to the wildcard search. Generally, more than one cell of retained data or targeted retained data may be associated with a single MSISDN or other identification number. For example, cell 745 contains a single MSISDN number, but retained data cells 794 and 796 indicate two separate start time for, for example, telephone calls places through network 405. Typically, all retained data associated with a single user may be identified or accessed in response to a wildcard search containing only a portion of a targeted users identification information, such as a MSISDN number.

Note that in FIGS. 1 through 7, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods described herein afford a simple and effective way to retrieve targeted retained data from a database. The systems and methods according to various embodiments are able to retrieve targeted retained data based on receiving a request that includes partial search matching criteria. This increases efficiency and operational speed, and lowers cost.

Any references to elements or steps of the systems and methods herein referred to in the singular may also embrace embodiments including a plurality of these elements, and any references in plural to any element or step herein may also embrace embodiments including only a single element. References in the singular or plural form are not intended to limit the presently disclosed systems or methods, their components, steps, or elements.

Any embodiment disclosed herein may be combined with any other embodiment, and references such as "an embodiment", "some embodiments", "an alternate embodiment", "various embodiments", or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features mentioned in any claim are followed by references signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

The invention claimed is:

1. A method of retrieving targeted retained data, the method implemented by a system which comprises a receiver, a processor, a transmitter and a database, the method comprising the steps of:

receiving, by the receiver, a request to access targeted retained data associated with a targeted user, the request including partial search matching criteria associated with the targeted user;

accessing, by the processor, a first table in the database, the first table including a plain column having unencrypted identification data associated with a plurality of users, and the first table including an encrypted index column having an encrypted index associated with each of the plurality of users;

selecting, by the processor, from the first table at least one encrypted index that matches the partial search matching criteria;

accessing, by the processor, a second table in the database, the second table including a plain index column having unencrypted index associated with each of the plurality of users, and the second table including a retained data column having a plurality of retained data including the targeted retained data;

selecting, by the processor, from the second table at least one unencrypted index associated with the at least one selected encrypted index;

identifying, by the processor, the targeted retained data in the column of retained data, where the targeted retained data associated with the at least one selected unencrypted index; and, retrieving, by the processor, the targeted retained data from the database.

2. The method of claim 1, further comprising the steps of:
decrypting, by the processor, the encrypted index column associated with the targeted retained data using a first key; and
re-encrypting, by the processor, the encrypted index column associated with the targeted retained data using a second key.

3. The method of claim 1 wherein receiving the request to access targeted retained data associated with the user comprises at least one of receiving a partial name of the targeted user or receiving a targeted user identity number.

4. The method of claim 1, further comprising the step of:
transmitting, by the transmitter, the targeted retained data to an authorized entity.

5. The method of claim 4, wherein transmitting the targeted retained data comprises transmitting the targeted retained data to a law enforcement monitoring facility.

6. The method of claim 4, further comprising the steps of:
transmitting, by the transmitter, administrative data associated with the targeted retained data to the authorized entity over a first handover interface; an,
transmitting, by the transmitter, the targeted retained data to the authorized entity over a second handover interface.

7. The method of claim 6, wherein the administrative data includes at least one of a date of creation of the retained data, a time of creation of the retained data, confirmation of the request to access targeted retained data, or data identifying the targeted user.

8. A system for retrieving targeted retained data from a database, comprising:

a receiver associated with a processor for receiving a request to access targeted retained data associated with a targeted user, the request including partial search matching criteria associated with the targeted user;

the processor configured to access a first table in the database, the first table including a plain column having unencrypted identification data associated with a plurality of users, and the first table including an encrypted index column having an encrypted index associated with each of the plurality of users; the processor configured to select from the first table at least one encrypted index that matches the partial search matching criteria;

the processor configured to access a second table in the database, the second table including a plain index column having unencrypted index associated with each of the plurality of users, and the second table including a retained data column having a plurality of retained data that includes the targeted retained data;

the processor configured to select from the second table at least one unencrypted index associated with the at least one selected encrypted index;

the processor configured to identify, in the column of retained data, the targeted retained data associated with the at least one selected unencrypted index; and, the processor configured to retrieve the targeted retained data from the database.

9. The system of claim 8, wherein:
- the processor is configured to decrypt the encrypted index column associated with the targeted retained data using a first key; and,
- the processor configured to re-encrypting the encrypted index column associated with the targeted retained data using a second key.

10. The system of claim 8, wherein the partial search matching criteria comprises at least one of a partial name of the targeted user or a targeted user identity number.

11. The system of claim 8, further comprising a transmitter configured to transmit the targeted retained data to an authorized entity.

12. The system of claim 11, wherein the transmitter transmits the targeted retained data to a law enforcement monitoring facility.

13. The system of claim 11, wherein:
- the transmitter is configured to transmit administrative data associated with the targeted retained data to the authorized entity from an administration function to the authorized entity over a first handover interface; and,
- the transmitter is configured to transmit the targeted retained data to the authorized entity from at least one of a mediation function and a delivery function over a second handover interface.

14. The system of claim 13, wherein the administrative data includes at least one of a date of creation of the retained data, a time of creation of the retained data, confirmation of the request to access targeted retained data, or data identifying the targeted user.

15. The system of claim 8, wherein the retained data and the targeted retained data comprise electronic data communications over at least one of a public switched telephone network and a mobile telephone network.

16. The system of claim 8, wherein the retained data and the targeted retained data are stored in the database associated with the processor.

17. An article of manufacture comprising a non-transitory program storage medium having computer readable program code embodied therein for retrieving targeted retained data from a database, the computer readable program code in the article of manufacture comprising:
- computer readable program code for causing a computer to receive a request to access targeted retained data associated with a targeted user, the request including partial search matching criteria associated with the targeted user;
- computer readable program code for causing the computer to access a first table in the database, the first table including a plain column having unencrypted identification data associated with a plurality of users, and the first table including an encrypted index column having an encrypted index associated with each of the plurality of users;
- computer readable program code for causing the computer to select from the first table at least one encrypted index that matches the partial search matching criteria;
- computer readable program code for causing the computer to access a second table in the database, the second table including a plain index column having unencrypted index associated with each of the plurality of users, and the second table including a retained data column having a plurality of retained data including the targeted retained data;
- computer readable program code for causing the computer to select from the second table at least one unencrypted index associated with the at least one selected encrypted index;
- computer readable program code for causing the computer to identify, in the column of retained data, the targeted retained data associated with the at least one selected unencrypted index; and,
- computer readable program code for causing the computer to retrieve the targeted retained data from the database.

18. A system for retrieving targeted retained data from a database, comprising:
- means for receiving a request to access targeted retained data associated with a targeted user, the request including partial search matching criteria associated with the targeted user;
- means for accessing a first table in the database, the first table including a plain column having unencrypted identification data associated with a plurality of users, and the first table including an encrypted index column having an encrypted index associated with each of the plurality of users;
- means for selecting from the first table at least one encrypted index that matches the partial search matching criteria;
- means for accessing a second table in the database, the second table including a plain index column having unencrypted index associated with each of the plurality of users, and the second table including a retained data column having a plurality of retained data including the targeted retained data;
- means for selecting from the second table at least one unencrypted index associated with the at least one selected encrypted index;
- means for identifying, in the column of retained data, the targeted retained data associated with the at least one selected unencrypted index; and,
- means for retrieving the targeted retained data from the database.

19. A method for enabling an authorized law enforcement agency to retrieve targeted retained telecommunication data that was obtained from a telecommunications network, the method implemented by a system which comprises a receiver, a processor, a transmitter and a database, the method comprising the steps of:
- receiving, by the receiver, data associated with electronic communications that took place over the telecommunications network;
- storing, at the database, the received data associated with the electronic communications that took place over the telecommunications network;
- receiving, by the receiver, a request from the authorized law enforcement agent to access targeted retained telecommunication data associated with a targeted user, the targeted retained telecommunication data is stored in the database, the request including partial search matching criteria associated with the targeted user;
- accessing, by the processor, a first table in the database, the first table including a plain column having unencrypted identification data associated with a plurality of users, and the first table including an encrypted index column having an encrypted index associated with each of the plurality of users;
- selecting, by the processor, from the first table at least one encrypted index that matches the partial search matching criteria;

accessing, by the processor, a second table in the database, the second table including a plain index column having unencrypted index associated with each of the plurality of users, and the second table including a retained data column having a plurality of retained data that includes the targeted retained data;

selecting, by the processor, from the second table at least one unencrypted index associated with the at least one selected encrypted index;

identifying, by the processor, the targeted retained data in the column of retained data, where the targeted retained data associated with the at least one selected unencrypted index;

retrieving, by the processor, the targeted retained data from the database; and transmitting, by the transmitter, the targeted retained data to the authorized law enforcement agent.

20. A system used by an authorized law enforcement agency for retrieving targeted retained telecommunication data that was obtained from a telecommunications network, the system comprising:

a receiver configured to receive data associated with electronic communications that took place over the telecommunications network;

a database configured to store the received data associated with the electronic communications that took place over the telecommunications network;

the receiver configured to receive a request from the authorized law enforcement agent to access targeted retained telecommunication data associated with a targeted user, the targeted retained telecommunication data is stored in the database, the request including partial search matching criteria associated with the targeted user;

a processor configured to access a first table in the database, the first table including a plain column having unencrypted identification data associated with a plurality of users, and the first table including an encrypted index column having an encrypted index associated with each of the plurality of users;

the processor configured to select from the first table at least one encrypted index that matches the partial search matching criteria;

the processor configured to access a second table in the database, the second table including a plain index column having unencrypted index associated with each of the plurality of users, and the second table including a retained data column having a plurality of retained data that includes the targeted retained data;

the processor configured to select from the second table at least one unencrypted index associated with the at least one selected encrypted index;

the processor configured to identify, in the column of retained data, the targeted retained data associated with the at least one selected unencrypted index;

the processor configured to retrieve the targeted retained data from the database; and a transmitter configured to transmit the targeted retained data to the authorized law enforcement agent.

* * * * *

UNITED STATES PATENT AND TRADEMARK OFFICE
CERTIFICATE OF CORRECTION

| | | |
|---|---|---|
| PATENT NO. | : 8,276,206 B2 | Page 1 of 1 |
| APPLICATION NO. | : 12/679344 | |
| DATED | : September 25, 2012 | |
| INVENTOR(S) | : La Rocca et al. | |

It is certified that error appears in the above-identified patent and that said Letters Patent is hereby corrected as shown below:

In the Specifications

In Column 1, Line 47, delete "an the" and insert -- the --, therefor.

In the Claims

In Column 14, Line 18, in Claim 3, delete "1" and insert -- 1, --, therefor.

In Column 14, Line 31, in Claim 6, delete "an," and insert -- and, --, therefor.

Signed and Sealed this
First Day of October, 2013

Teresa Stanek Rea
*Deputy Director of the United States Patent and Trademark Office*